(12) United States Patent
Bornheimer et al.

(10) Patent No.: US 9,459,846 B2
(45) Date of Patent: Oct. 4, 2016

(54) USER INTERFACE STYLE GUIDE COMPLIANCE

(75) Inventors: Karin Bornheimer, Bensheim (DE); Tobias Haug, Rellingen (DE); Thomas Uhl, Hanhofen (DE); Carsten Brandt, Mannheim (DE)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 13/018,106

(22) Filed: Jan. 31, 2011

(65) Prior Publication Data
US 2012/0198368 A1 Aug. 2, 2012

(51) Int. Cl.
G06F 3/048 (2013.01)
G06F 9/44 (2006.01)

(52) U.S. Cl.
CPC .. G06F 8/38 (2013.01); G06F 8/77 (2013.01)

(58) Field of Classification Search
USPC ......... 715/704, 763, 700, 235; 714/E11.208; 707/999; 705/126
See application file for complete search history.

(56) References Cited

U.S. PATENT DOCUMENTS

| | | | |
|---|---|---|---|
| 5,327,529 A | 7/1994 | Fults et al. | |
| 5,677,997 A | 10/1997 | Talatik | |
| 5,850,535 A | 12/1998 | Maystrovsky et al. | |
| 5,990,887 A | 11/1999 | Redpath et al. | |
| 6,430,599 B1 | 8/2002 | Baker et al. | |
| 6,983,227 B1 | 1/2006 | Thalhammer-Reyero | |
| 7,243,335 B1 | 7/2007 | Andrew et al. | |
| 7,296,017 B2 * | 11/2007 | Larcheveque et al. | |
| 7,398,469 B2 * | 7/2008 | Kisamore et al. ............ 715/704 |
| 7,424,410 B2 | 9/2008 | Orofino et al. | |
| 7,451,403 B1 | 11/2008 | Srinivasan | |
| 7,584,457 B2 * | 9/2009 | Hammerich ............ G06F 8/436 717/115 |
| 7,792,934 B2 | 9/2010 | Klein | |
| 7,853,678 B2 | 12/2010 | Khemani et al. | |
| 7,853,679 B2 | 12/2010 | Khemani et al. | |

(Continued)

FOREIGN PATENT DOCUMENTS

EP 2 065 799 A1 6/2009

OTHER PUBLICATIONS

Il-Kyu Ha: Byung-Wook Kang, Meta-validation of UML structural diagrams and behavioral diagrams with consistency rules,: Communications, Computers, and signal Processing, 2003, PACRIM. 2003 IEEE Pacific Rim Conference omVol 2. pp. 679-683, Aug. 2003.

(Continued)

*Primary Examiner* — Matthew Ell
(74) *Attorney, Agent, or Firm* — Fish & Richardson P.C.

(57) ABSTRACT

This disclosure provides various embodiments for checking user interfaces' compliance with user style guide rules in connection with a UI development tool. A particular digital UI model is identified in a plurality of digital UI models, each UI model representing attributes of a corresponding software application user interface in a plurality of user interfaces available for access by a UI development tool adapted to modify attributes of user interfaces in the plurality of user interfaces. The particular UI model represents attributes of a particular user interface accessed by the UI development tool. The particular UI model is parsed to determine that at least one attribute of the particular user interface violates at least one UI style guide rule. Results are presented in a user interface of the UI development tool, the presentation indicating that the particular attribute of the particular user interface violates the UI style guide rule.

20 Claims, 13 Drawing Sheets

(56) References Cited

U.S. PATENT DOCUMENTS

| | | | |
|---|---|---|---|
| 7,865,589 B2 | 1/2011 | Khemani et al. | |
| 7,870,277 B2 | 1/2011 | Korrapati et al. | |
| 7,925,694 B2 | 4/2011 | Harris | |
| 8,090,877 B2 | 1/2012 | Agarwal et al. | |
| 8,127,237 B2 | 2/2012 | Beringer | |
| 8,131,668 B2 | 3/2012 | Beringer et al. | |
| 8,161,399 B2* | 4/2012 | Kannan | G06F 9/4443 715/736 |
| 8,181,155 B2 | 5/2012 | Pinto et al. | |
| 8,184,070 B1 | 5/2012 | Taubman | |
| 8,191,042 B2 | 5/2012 | Pinto et al. | |
| 8,234,332 B2 | 7/2012 | Jaudon et al. | |
| 8,239,239 B1 | 8/2012 | Malhotra et al. | |
| 8,250,169 B2 | 8/2012 | Beringer et al. | |
| 8,276,193 B2 | 9/2012 | Cox et al. | |
| 8,341,287 B2 | 12/2012 | Khemani et al. | |
| 8,453,065 B2 | 5/2013 | Chaudhrl | |
| 8,458,662 B2 | 6/2013 | Grechanik et al. | |
| 8,467,133 B2 | 6/2013 | Miller | |
| 8,472,120 B2 | 6/2013 | Border et al. | |
| 8,477,425 B2 | 7/2013 | Border et al. | |
| 8,482,859 B2 | 7/2013 | Border et al. | |
| 8,488,246 B2 | 7/2013 | Border et al. | |
| 8,490,148 B2 | 7/2013 | Sikka et al. | |
| 8,527,313 B2 | 9/2013 | Beringer et al. | |
| 8,560,941 B2 | 10/2013 | Burns | |
| 8,572,500 B2 | 10/2013 | Salva et al. | |
| 8,615,712 B2 | 12/2013 | Porter et al. | |
| 8,667,415 B2 | 3/2014 | Rudolph et al. | |
| 8,671,351 B2 | 3/2014 | Riggs et al. | |
| 8,671,352 B1 | 3/2014 | Hsu et al. | |
| 8,726,174 B2 | 5/2014 | Ehret et al. | |
| 8,799,808 B2 | 8/2014 | Satterfield et al. | |
| 8,832,572 B2 | 9/2014 | Waher | |
| 8,869,027 B2 | 10/2014 | Louch et al. | |
| 8,881,034 B2 | 11/2014 | Pereira et al. | |
| 8,954,870 B2 | 2/2015 | Martin et al. | |
| 8,954,871 B2 | 2/2015 | Louch et al. | |
| 8,972,895 B2 | 3/2015 | Gonsalves et al. | |
| 2002/0085020 A1 | 7/2002 | Carroll et al. | |
| 2003/0040997 A1 | 2/2003 | Rousseau et al. | |
| 2003/0083767 A1 | 5/2003 | Karlsberg | |
| 2003/0188291 A1 | 10/2003 | Fisher | |
| 2004/0001092 A1 | 1/2004 | Rothwein | |
| 2004/0015819 A1 | 1/2004 | Romano-Critchley et al. | |
| 2004/0148586 A1 | 7/2004 | Giboa | |
| 2004/0153992 A1 | 8/2004 | Molina-Moreno et al. | |
| 2004/0250257 A1 | 12/2004 | Koutyrine et al. | |
| 2004/0260568 A1 | 12/2004 | Johnson | |
| 2005/0166094 A1 | 7/2005 | Blackwell et al. | |
| 2006/0130048 A1 | 6/2006 | Ho | |
| 2006/0248467 A1 | 11/2006 | Elvanoglu et al. | |
| 2007/0118813 A1 | 5/2007 | Forstall | |
| 2007/0300185 A1 | 12/2007 | Macbeth et al. | |
| 2008/0104140 A1 | 5/2008 | Vierich et al. | |
| 2008/0104617 A1 | 5/2008 | Apacible | |
| 2008/0148221 A1 | 6/2008 | Letkeman et al. | |
| 2008/0148235 A1 | 6/2008 | Foresti et al. | |
| 2008/0163078 A1 | 7/2008 | Van Der Sanden et al. | |
| 2008/0178102 A1* | 7/2008 | Kannan et al. | 715/764 |
| 2008/0275910 A1 | 11/2008 | Molina-Moreno et al. | |
| 2008/0301553 A1 | 12/2008 | Basu et al. | |
| 2008/0313650 A1 | 12/2008 | Arnquist | |
| 2009/0024944 A1 | 1/2009 | Louch | |
| 2009/0112832 A1 | 4/2009 | Kandogan | |
| 2009/0172632 A1 | 7/2009 | Kashai | |
| 2009/0217100 A1 | 8/2009 | Grechanik et al. | |
| 2009/0217182 A1 | 8/2009 | Grechanik et al. | |
| 2009/0217302 A1 | 8/2009 | Grechanik et al. | |
| 2009/0293005 A1 | 11/2009 | Hooyman et al. | |
| 2010/0222000 A1 | 9/2010 | Sauer et al. | |
| 2011/0153293 A1 | 6/2011 | Coldicott et al. | |
| 2011/0161941 A1 | 6/2011 | Thomson et al. | |
| 2011/0208855 A1 | 8/2011 | Robertson et al. | |
| 2011/0270959 A1 | 11/2011 | Schlusser | |
| 2012/0030612 A1 | 2/2012 | Aziz et al. | |
| 2012/0124494 A1 | 5/2012 | Grechanik et al. | |
| 2012/0143777 A1 | 6/2012 | Jensen | |
| 2012/0174000 A1 | 7/2012 | Zavatone | |
| 2014/0040788 A9 | 2/2014 | Malhotra et al. | |
| 2014/0040790 A1 | 2/2014 | Nurse et al. | |
| 2014/0208243 A1 | 7/2014 | Werner | |
| 2014/0365895 A1 | 12/2014 | Magahern et al. | |
| 2015/0040041 A1 | 2/2015 | Yang et al. | |
| 2015/0040043 A1 | 2/2015 | Sakhardande et al. | |
| 2015/0050633 A1 | 2/2015 | Christmas et al. | |

OTHER PUBLICATIONS

Office Action issued in U.S. Appl. No. 13/017,748 on Dec. 2, 2013; 25 pages.

Extended European Search Report issued in European Application No. 12000578.0 on Jul. 26, 2012; 7 pages.

Jouault, Frederic et al.: "Transforming Models with ATL"; Satellite Events at the Models, 2005 Conference; Lecture Notes in Computer Science; Jan. 2006; pp. 128-138.

Office Action issued in U.S. Appl. No. 13/017,428 on Jun. 6, 2013; 22 pages.

Office Action issued in U.S. Appl. No. 13/017,428 on Sep. 25, 2013; 27 pages.

Office Action issued in U.S. Appl. No. 13/017,748 on Jun. 11, 2014; 26 pages.

Office Action issued in U.S. Appl. No. 13/017,790 on Jun. 6, 2014; 35 pages

Office Action issued in U.S. Appl. No. 13/017,920 on Jun. 26, 2014; 28 pages.

Tai, H.; Mitsui, K.: nerome, T.: Abe, M.: no, K.: Hori. M., "Model-driven development of large-scale Web applications," IBM Journal of Research and Development, vol. 48, No. 5, 6, pp. 797,809, Sep. 2004.

Web Style Guide 3rd edition Lynch et al 2011.

Bing Search q=adapt+user+interface+style&src=IE—May 1, 2016.

Office Action issued in U.S. Appl. No. 13/017,428 on Mar. 25, 2015; 27 pages.

Office Action issued in U.S. Appl. No. 13/017,428 on Oct. 7, 2015; 28 pages.

Office Action issued in U.S. Appl. No. 13/017,428 on May 18, 2016, 35 pages.

Office Action issued in U.S. Appl. No. 13/017,748 on Oct. 3, 2014; 27 pages.

Office Action issued in U.S. Appl. No. 13/017,790 on Jun. 27, 2016; 20 pages.

Office Action issued in U.S. Appl. No. 13/017,790 on Dec. 17, 2014; 36 pages.

Office Action issued in U.S. Appl. No. 13/017,790 on May 20, 2015; 36 pages.

Office Action issued in U.S. Appl. No. 13/017,790 on Sep. 11, 2015; 35 pages.

Office Action issued in U.S. Appl. No. 13/017,920 on Jun. 27, 2016; 21 pages.

Office Action issued in U.S. Appl. No. 13/017,920 on Dec. 19, 2014; 34 pages.

Office Action issued in U.S. Appl. No. 13/017,920 on Sep. 10, 2015; 33 pages.

* cited by examiner

```
<base:TextPoolEntry id="uyMi5GufSqs7HYtv10$Pj0" textuid="cepzlYYeHaoKzxmE271_kG" text="Sales Document Type" textCategory="XCOL"/>
<base:TextPoolEntry id="BarlVh8lxq6iz$xu117A6W" textuid="v0kcm1fQ6Kw418LNbyW28G" text="Production Lot" textCategory="XCOL"/>
<base:TextPoolEntry id="ASeHvG0tn4_uKA9vmYRd3W" textuid="Jp3k9Aslb4gmYOM_gC3CzG" text="Material ID" textCategory="XCOL"/>
<base:TextPoolEntry id="S$pS1fic14okHdX9AOrGx0" textuid="_0eku81zXtqQF81ojSx01PG" text="Business Partner ID" textCategory="XCOL"/>
<base:TextPoolEntry id="fRPGZfmAqsRETdq7XbOBocW" textuid="izzdhthu9qs75nHtgzlerO" text="Bank ID" textCategory="XCOL"/>
<base:TextPoolEntry id="1h8l8hu2K_HtL127HY57m" textuid="11GKC$tPhaswvHsV88p5cm" text="Details: Line Items of (0)" textCategory="XGRP"/>         ← 305
<base:Placeholder id="7Zz0w0YikaU2empXNMaV6G" binding="/Root/Interactor1_AKA/ID_FB">
  <base:Identifier>CCT5Config id="1h$vFwcu0Kim6AFiqpQmz0"/>
  </base:Placeholder>
</base:TextPoolEntry>
<base:TextPoolEntry id="Fedlhpzm9q2ipey42io4CG" textuid="1HJaloyc846vlR93YIARp0" text="You can view the journal entry vouchers with their current
status. Journal entry vouchers serve as entry forms for manual postings. If a journal entry voucher is posted, a corresponding journal entry is created."
textCategory="YINS"/>
<base:TextPoolEntry id="BYmfmEQq3qcpgB8SnkwoYG" textuid="K_ncixfFE4oJlUs90ArMzG" text="Text describing a journal entry voucher." ← 315
textCategory="YEXP"/>
<base:TextPoolEntry id="hfYh7bEEbKgGr6L2PNvrdm" textuid="3g_FuMa77q62wEqoxVacbW" text="Multi Selection of Journal Entry Vouchers to reverse"
textCategory="XTIT"/>
<base:TextPoolEntry id="6GW1_AfMdqgtqgCEW3L1KG" textuid="FTOd_G9H8a8UWRzhRLpeNom" text="Selection of multiple Journal Entry Voucher for reverse
not permitted. Select only one Journal Entry Voucher to reverse." textCategory="YMSG"/>
```

FIG. 3B

```
foreach (string[] detailsAreaTitle in detailsAreaTitles)
{
    if (results.Count == 0)
    {
        //results.Add(new HandlerResult(HandlerResultCategory.VIOLATION, 10, element.Attribute("id").Value.ToString()
        // check if the title is created with a calculation Rule that was could not be identified
        if (detailsAreaTitle[0].Contains("999") == true)
        {
            results.Add(new HandlerResult(HandlerResultCategory.INFORMATION, Priority.MEDIUM, 2, RuleMsg.M117_02));
            return results;
        }
        // check if title starts with "Details:"
        if (detailsAreaTitle[1].StartsWith("Details:") == false)
            results.Add(new HandlerResult(HandlerResultCategory.VIOLATION, Priority.HIGH, 1, RuleMsg.M117_01));
```

FIG. 3C

| App | UI Type | Category | Priority | Attribute | Error Message |
|---|---|---|---|---|---|
| HC | OWL | VIOLATION | HIGH | Controller/Queries/Query(name=Query) | Query Query does not contain queryPath attribute |
| TEST | OWL | WARNING | MEDIUM | Controller/TextPool/TextBlockController/TextPoolEntry(uuid=svOru4) | Text pool entry with UUID='svOru4' doesn't have an ESR text ID specified nor a local text is maintained. |
| TEST | OWL | WARNING | MEDIUM | Controller/TextPool/TextBlockController/TextPoolEntry(uuid=Icathn) | Text pool entry with UUID='Icathn' doesn't have an ESR text ID specified nor a local text is maintained. |
| TEST | OWL | VIOLATION | HIGH | DataModel(name=Root)/Structure(name=QueryPara)/DataField(name=Description) | DataField 'Description' is used more than once in Query(s): 'Query'. |
| Support | FS | WARNING | MEDIUM | Controller/TextPool/TextBlockController/TextPoolEntry(uuid=cvbzW8) | Text pool entry with UUID='cvbzW8' doesn't have an ESR text ID specified nor a local text is maintained. |

FIG. 6A

Check Results

| 2 UX Rules | 9 Consistency Rules | 0 Self-Defined Todos | 0 Post Migration Steps | Add Self-Defined Todo | Filter On/Off |

| | Priority | Type | Message/Details | Name | Status | Action |
|---|---|---|---|---|---|---|
| 626a ⚠ | 3 | Consistency | List column static text defined as calculation rule 624 | Check whether list column value will be calculated | Open | Exception / Incident |
| 626b ⊗ | 3 | Consistency | Binding for DataField 'PartyID_BPU_DE' is wrong. Binding should be relative to the association to which its parent is bound. | Relative Binding Of List DataField | Open | Exception / Incident |
| ⚠ | 3 | Consistency | List column static text defined as calculation rule | Check whether list column value will be calculated | Open | Exception / Incident |
| ⊗ | 3 | Consistency | Binding for DataField 'VendorFormattedName_BPX_DE' is wrong. Binding should be relative to the association to which its parent is bound. | Relative Binding Of List DataField | Open | Exception / Incident |
| ⚠ | 3 | Consistency | List column link text defined as calculation rule | Check whether list column value will be calculated | Open | Exception / Incident |
| ⚠ | 3 | Consistency | PaneContainer has only one PaneContainerVariant 'TabContainer2_CHG'. It should have either none or at least two. | Consistency check of PaneContainerVariant | Open | Exception / Incident |
| ⚠ | 3 | Consistency | List column static text defined as calculation rule | Check whether list column value will be calculated | Open | Exception / Incident |

Path: List(name=General_List)
DataModel(name=Root)/List(name=General_List)

| Count of Issue_id | area | sub_area | Total |
|---|---|---|---|
| message | | | |
| Button 'Close' recognized as generic button and placed incorrectly; place it according to the styleguide | | | 8 |
| Button 'New' recognized as generic button and placed incorrectly; place it according to the styleguide | | | 1 |
| Button 'Preview' recognized as generic button and placed incorrectly; place it according to the styleguide | | | 2 |
| Button 'Save and Close' recognized as generic button and placed incorrectly; place it according to the styleguide | | | 3 |
| 'Close' button in the 'ActionButtons' group is in the wrong position; place it at the last position | | | 1 |
| Mandatory 'Close' button missing on the toolbar or placed incorrectly; place it in 'Action Buttons' group | | | 14 |
| Mandatory F-Action or 'Save and Close' button is missing or at the wrong position; place | 01 UI | | 4 |
| | 02 XT | | 4 |
| | 03 ECO | | 27 |
| | 06 LOG | | 8 |
| | 07 FIN | | 18 |
| | 08 FDN | | 2 |
| | 09 GLO | | 1 |
| | 10 LCM | | 3 |
| | not assigned | | 30 |
| Mandatory F-Action or 'Save and Close' button is missing or at the wrong position; place it at the first position Total | | | 97 |
| Mandatory 'New' button missing on the toolbar or placed incorrectly; place it in 'Related Action Buttons' group | | | 207 |
| 'Print' button placed incorrectly; use only 'Preview' in 'StandardButtons' group | | | 2 |
| 'Send' button placed incorrectly; use only 'Preview' in 'StandardButtons' group | | | 10 |
| 'Send' button placed incorrectly; use only 'Preview' in 'StandardButtons' group | | | 1 |
| 'Send E-Mail' button placed incorrectly; use only 'Preview' in 'StandardButtons' group | 02 XT | | 1 |
| Grand Total | | | 346 |

USER INTERFACE STYLE GUIDE COMPLIANCE

TECHNICAL FIELD

This present disclosure relates to software application user interfaces, and more particularly to handling violations of user-interface-related consistency rules.

BACKGROUND

Modern software applications, adapted for use with human users, typically employ at least one user interface to display data, controls, media, and other information to the user. Software application user interfaces (or "user interfaces," or "UIs") can also be interactive, allowing a user to interact with elements, controls, and data displayed on a graphical user interface device via a keyboard, mouse, touchscreen, and other devices. In some modern software applications and services, a single program or application can include several different user interfaces that can be displayed to and interacted with by the user. Further, in some enterprise software solutions offering or serving dozens of different software programs and services to end users, hundreds, and even thousands of related user interfaces can be provided and maintained within the software environment.

As computing and software markets mature, the development of user interfaces for software solutions and systems has grown more sophisticated. For instance, user experience design principles have been integrated into the design of modern software products. User experience design is user-centered, focusing on designing products, in this case software, with a primary focus on the user's experience and interaction with the product. User experience (or "UX") design principles aim to make users' interactions as simple, efficient, and enjoyable as possible. Considerations of user experience design can include various dimensions including the look, feel, access to tools and services, and communication and co-operation support provided through the user interface. Indeed, international standard (e.g., ISO 9241) have established describing interface design requirements for usability.

Some products have been developed to assist product designers in realizing user-centered design, such as user interface prototyping and simulation tools. In some cases, software user interface design solutions can be proposed and promoted through a user interface style guide defining rules, conventions, preferences, and guidelines for user interfaces within a system. In some cases, user interface style guide can also focus on maintaining user interface consistency across a software product, for example, to promote a consistent particular product appearance, familiar user controls, or maintain a product trade dress.

SUMMARY

This disclosure provides various embodiments for checking user interfaces' compliance with a set of user style guide rules in connection with a UI development tool. At least one particular digital UI model can be identified in a plurality of digital UI models, each UI model representing attributes of a corresponding software application user interface in a plurality of user interfaces available for access by a UI development tool adapted to modify attributes of user interfaces in the plurality of user interfaces. The particular digital UI model can represent attributes of a particular user interface accessed by the UI development tool. The particular UI model can be parsed to determine that at least one attribute of the particular user interface violates at least one particular user interface style guide rule in a plurality of user interface style guide rules. Results can be sent for presentation in a user interface of the UI development tool, the presentation of results indicating that the at least one particular attribute of the particular user interface violates the particular user interface style guide rule.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3B is a representation of a snippet of an example parsable UI model data file.

FIG. 3C is a representation of a snippet of an example UI style guide rule check script.

FIGS. 6A, 6B-1, 6B-2, and 6C illustrate example screenshots of UIs used in connection with an example UI rules engine.

Like reference symbols in the various drawings indicate like elements.

DETAILED DESCRIPTION

Developing user interfaces (UIs) for software applications can be an expensive and resource-intensive process. Further, developing UIs within an existing software application environment can be further complicated by efforts to maintain consistency across all user interfaces in an application or software environment. Software products are rarely static however, and designers can opt for modifications to existing or previous UIs. Propagating these changes across each and every UI within a multi-UI system can be challenging and, in some cases, require redevelopment of one or more user interfaces in the system. Indeed, in large software environments, such as distributed enterprise software systems employing thousands of UIs within the system, making changes to and discovering inconsistencies among the design of the multiple UI can be prohibitively burdensome.

In some instances, parsable, digital UI models can be used to model attributes of user interfaces within a software environment. For instance, the location, labeling, color, size, and formatting of various UI elements within a particular UI can be described and defined within the UI model. Similar UI models can be generated and maintained for each UI within a particular software environment. A common UI style guide can be employed for UIs within the environment, with a plurality of executable UI rule check scripts being maintained and made available to automatically check the UI models to determine whether particular UIs in the environment are in violation of one or more UI style guide rules. Such UI rule check scripts can be integrated within UI development tools to further give users immediate feedback regarding UI design choices and can further be the basis of UI development planning and consistency reporting within the context of a UI design time effort. UI rule check scripts can facilitate quick and system-wide UI style guide rule consistency checks and can facilitate mass modifications of UI models to correct violations of UI style guide rules.

Figure 1:
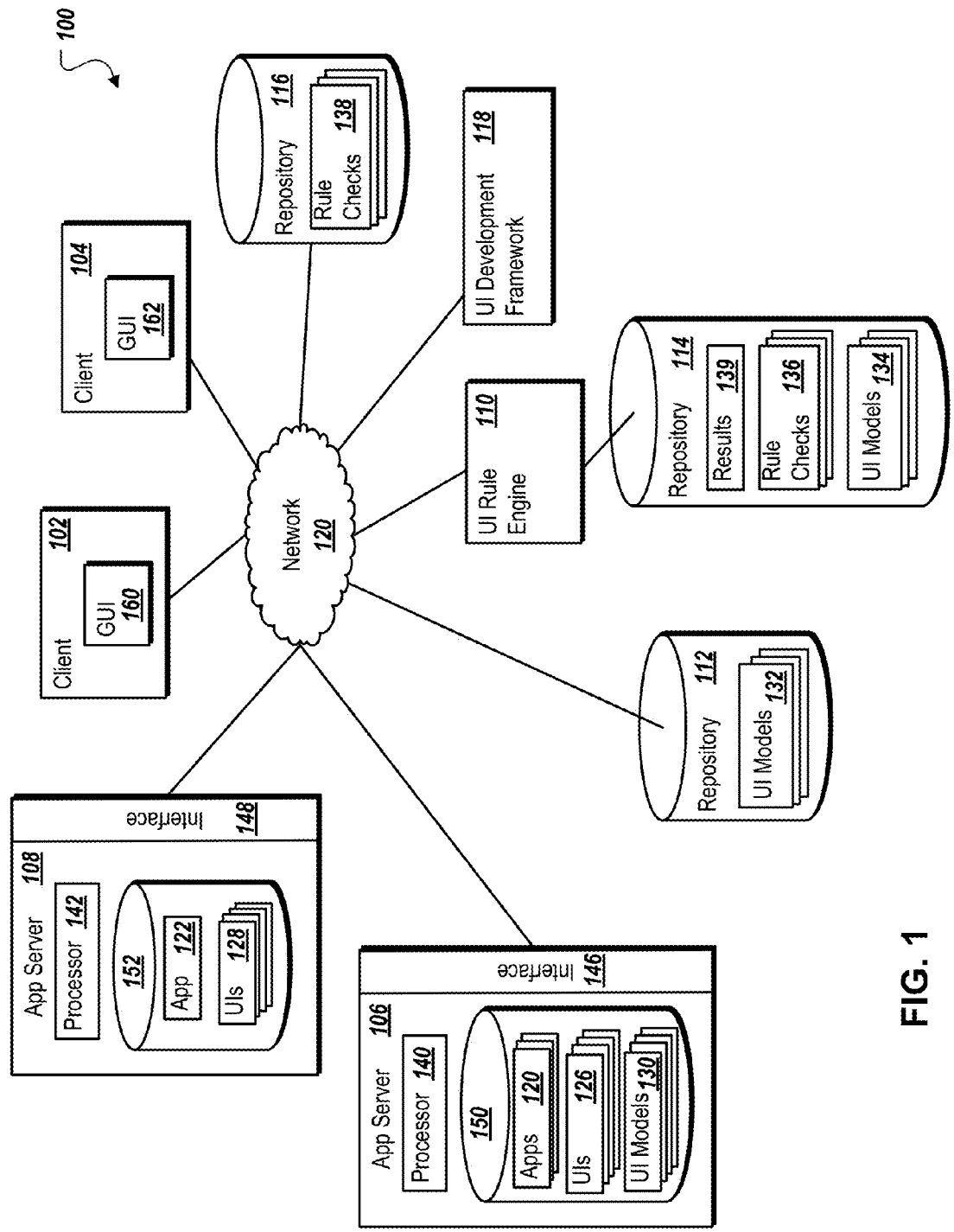
FIG. 1 illustrates an example system including a UI rules engine.

Turning to the example implementation of FIG. 1, the illustrated software environment 100 includes, or is communicably coupled with, one or more clients 102, 104, one or more application servers (e.g., 106, 108), such as application servers within an enterprise software environment, and one or more data repositories (e.g., 112, 114, 116), using one or more networks 120. The environment 100 can further include a UI rule engine 110 adapted to manage and facilitate consistency checks on multiple UI models (e.g., 130, 132, 134) modeling UIs (e.g., 126, 128) within the software environment 100, as well as a UI development tool 118. Each of servers 106, 108, UI rule engine 110, and UI development tool 118 can comprise electronic computing devices operable to receive, transmit, process, store, or manage data and information associated with the software environment 100. As used in this document, the term "computer" is intended to encompass any suitable processing device. For example, the environment 100 may be implemented using computers other than servers, including a server pool. Further, any, all, or some of the servers 106, 108 may be adapted to execute any operating system, including Linux, UNIX, Windows Server, or any other suitable operating system.

UI rule engine 110 can access and, in some examples, modify one or more UI models (e.g., 130, 132, 134) and UI rule check scripts (e.g., 136, 138) stored in and/or served by one or more data repositories 112, 114, 116. For example, the UI rule engine can retrieve and execute one or more UI rule check scripts (e.g., 136, 138) to parse one or more UI models (e.g., 130, 132, 134) to determine whether UIs (e.g., 126, 128) modeled by the UI models (e.g., 130, 132, 134) satisfy UI rules, such as UI style guide rules, corresponding to the UI rule check scripts (e.g., 136, 138). UIs 126, 128 can be UIs of one or more applications and services (e.g., 120, 122) served by application servers 106, 108 to clients 102, 104. Result data (e.g., 139) can be generated based on the execution of the UI rule check scripts (e.g., 136, 138) and stored in data repositories (e.g., 114) for use, for example, by UI rule engine in performing reporting and further analysis of UI style guide compliance.

In some instances, UI rule engine 110 can operate in connection with a UI development framework 118. UI development framework can include software and systems adapted to develop and modify UIs, for example, in a graphical development environment. Design decisions implemented for a UI under development using the UI development framework can be analyzed using UI rule engine to provide feedback regarding the design decision's consistency with UI style guide rules. In some instances, UI rule engine can be integrated with UI development framework 118 and UI development framework 118 can access and modify UI models (e.g., 130, 132, 134) in connection with development of a UI corresponding to the UI model.

Application servers 106, 108 can each include one or more processors 140, 142, at least one interface 146, 148, and computer-readable memory 150, 152. Application servers can be configured to serve web services (e.g., 120, 122), such as SOA-based or enterprise web services, for example. In some instances, some combination of application servers 106, 108 can be hosted on a common computing system, server, or server pool, and share computing resources, including shared memory, processors, and interfaces, such as in an enterprise software system serving services to a plurality of distinct clients and customers. The interfaces 146, 148 can be used for communicating with other systems in a client-server or other distributed environment (including within environment 100) connected to the network 120, for example the one or more clients 102, 104, external data sources (e.g., 116), or any other computing device adapted to interface with the servers 106, 108, including devices not illustrated in FIG. 1. Generally, each interface 146, 148 comprises logic encoded in software and/or hardware in a suitable combination and operable to communicate with the network 120. More specifically, the interfaces 146, 148 may comprise software supporting one or more communication protocols associated with communications such that the network 120 or hardware is operable to communicate physical signals within and outside of the illustrated software environment 100.

Each processor 140, 142 can execute instructions and manipulate data to perform the operations of an associated server or system (e.g., 106, 108) and may comprise, for example, a central processing unit (CPU), a blade, an application specific integrated circuit (ASIC), or a field-programmable gate array (FPGA), among other suitable options. Although each processor 140, 142 is illustrated as a single processor, multiple processors may be used according to the particular needs of the associated server. References to a single processor 140, 142 are meant to include multiple processors where applicable. The operations that each processor 140, 142 executes are determined by the purpose and operations of its associated server. Generally, the processor 140, 142 executes instructions and manipulates data to perform the operations of its respective server and, specifically, the software systems, services, and applications hosted by the servers 106, 108.

At a high level, each "server" (e.g., 106, 108) includes one or more electronic computing devices operable to receive, transmit, process, store, or manage data and information associated with the environment 100. Specifically, a server is responsible for receiving requests from one or more clients and sending the appropriate response to the requesting client. In addition to requests from external clients, requests may also be sent from internal users, external or third-party customers, other automated applications, as well as any other appropriate entities, individuals, systems, or computers. For example, although FIG. 1 illustrates each server as a single server, a server can be implemented using two or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, servers may be adapted to execute any operating system, including Linux, UNIX, Windows, Mac OS, or any other suitable operating system.

In the case of servers hosting, serving, or otherwise providing software services or products, a processor (e.g., 140, 142) can execute the functionality required to receive and respond to requests from clients, as well as client applications interfacing with the server's hosted application (e.g., 120, 122). It will be understood that the term "application server" (e.g., 106, 108) can include any suitable software component or module, or computing device(s) capable of hosting and/or serving a software application, including distributed, enterprise, or cloud-based software applications. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate.

At a high level, each of the one or more hosted applications and services (e.g., 120, 122) illustrated in the environment 100 can include any application, program, module, process, or other software that may execute, change, delete, generate, or otherwise manage information according to the present disclosure, particularly in response to and in connection with one or more requests received from the illustrated clients 102, 104, as well as other applications. In certain cases, only one hosted application may be located at a particular server. In others, a plurality of related and/or unrelated hosted applications may be stored at a single server, or located across a plurality of other servers, as well. In certain cases, environment 100 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via the network 120 (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client (e.g., 102, 104). Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

Each of the example servers 106, 108 can also include a memory (150, 152 respectively). Further repositories 112, 114, 116 and client computing devices (e.g., 102, 104) can also each include at least one memory device. Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may further store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as VPN applications, firmware logs and policies, firewall policies, a security or access log, print or other reporting files, as well as others. Again, the particular data and instructions stored in each memory (e.g., 112, 114, 116, 150, 152) will be described in detail below in connection with the illustrated implementations of the software environment 100 and components thereof.

Generally, the network 120 facilitates wireless or wireline communications between the components of the software environment 100 (e.g., between the UI rule engine 110, data repositories 112, 114, 116 and one or more clients (e.g., 102, 104) as well as between other components as appropriate), as well as with any other local or remote computer, such as those associated with one or more applications or external data sources. The network 120 can be implemented as one or more distinct networks. In any implementation, the network 120 may be a continuous or discontinuous network without departing from the scope of this disclosure, so long as at least a portion of the network 120 may facilitate communications between senders and recipients. The network 120 may be all or a portion of an enterprise or secured network. As an example, in FIG. 1 networks 120 may represent a portion of an enterprise network, or a connection to the Internet. In some instances, a portion of the network 120 may be a virtual private network (VPN). All or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1 includes one or more local and/or remote clients 102, 104. A client 102, 104 can be any computing device operable to connect or communicate at least with an application server 106, 108, and/or the network 120 using a wireline or wireless connection.

Each client 102, 104 includes at least one GUI (e.g., 160, 162). In general, the client 102, 104 comprises an electronic computing device operable to receive, transmit, process, and store any appropriate data associated with the software environment of FIG. 1. It will be understood that there may be any number of clients 102, 104 associated with environment 100, as well as any number of clients 102, 104 external to environment 100. Further, the term "client" and "user" may be used interchangeably as appropriate without departing from the scope of this disclosure. Moreover, while each client 102, 104 is described in terms of being used by one user, this disclosure contemplates that many users may use one computer or that one user may use multiple computers. As used in this disclosure, the client 102, 104 is intended to encompass a personal computer, electronic notepad, touch screen terminal, workstation, network computer, kiosk, wireless data port, smart phone, personal data assistant (PDA), one or more processors within these or other devices, or any other suitable processing device. For example, the client 102, 104 may comprise a computer that includes an input device, such as a keypad, touch screen, mouse, or other device that can accept information, and an output device that conveys information associated with operations of one or more applications stored and/or executed on an application server (or other servers in environment 100) or on the client 102, 104 itself, including digital data, visual information, or GUI 160, 162. Both the input device and the output device may include fixed or removable storage media such as a magnetic computer disk, CD-ROM, or other suitable media to both receive input from and provide output to users of the clients 102, 104 through the display, namely the GUI 160, 162.

The GUI 160, 162 comprises a graphical user interface operable to allow the user to interface with at least a portion of environment 100 for any suitable purpose, including allowing a user to interact with one or more software applications and services (e.g., 120, 122). Generally, the GUI 160, 162 provides users with an efficient and user-friendly presentation of data provided by or communicated within the system, such as UI of the UI development framework 118 or an application managed using UI rule engine 110 or developed using UI development framework 118. The term "graphical user interface," or GUI, may be used in the singular or in the plural to describe one or more graphical user interfaces and each of the displays of a particular graphical user interface. Therefore, the GUI 160, 162 can be any graphical user interface, such as a web browser, touch screen, or command line interface (CLI) that processes information in the environment 100 and efficiently presents the results to the user. In general, UIs displayed using the GUI 160, 162 may include a plurality of user interface (UI) elements such as interactive fields, pull-down lists, media players, tables, graphics, virtual machine interfaces, buttons, etc. operable by the user at the client. These UI elements may be related to the functions of one or more applications or services (e.g., 120, 122), including applications hosted locally at the client.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
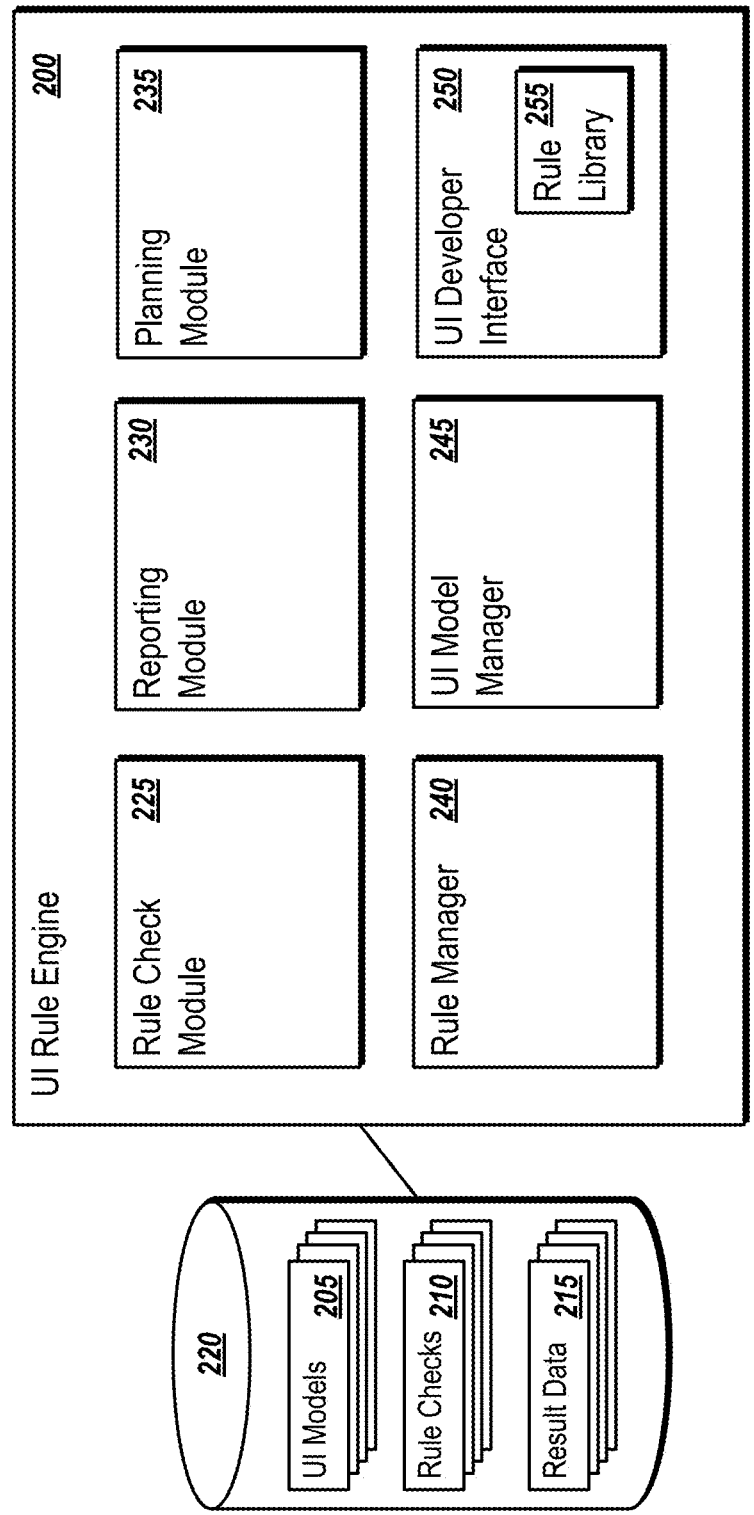
FIG. 2 is a schematic representation of an example UI rules engine.

FIG. 2 is a schematic representation of an example UI rules engine 200. The UI rules engine 200 can access a plurality of UI models 205, UI rule check scripts 210, as well as check result data 215 to perform various operations relating to checking and maintaining UI style guide consistency across a plurality of software application UIs modeled by the UI models 205. A UI rule check can be performed, for example, by a rule check module 225. In this particular example, a rule check module 225 can identify and retrieve UI models pertaining to a particular rule check. For instance, rule check module 225 can identify that the rule check is to be performed on a particular application having a corresponding set of UIs. Accordingly, rule check module 225 can identify those UI models 205 corresponding to and modeling attributes of the particular application's UIs. The rule check module 225 can further identify those UI rule check scripts 210 needed to perform the check. Each UI rule check script 210 can correspond to a particular UI style guide rule. Accordingly, the rule check module 225 can identify those UI rule check scripts 210 corresponding to the set of UI style guide rules against which the relevant set of UIs is to be checked for compliance.

Figure 3A:
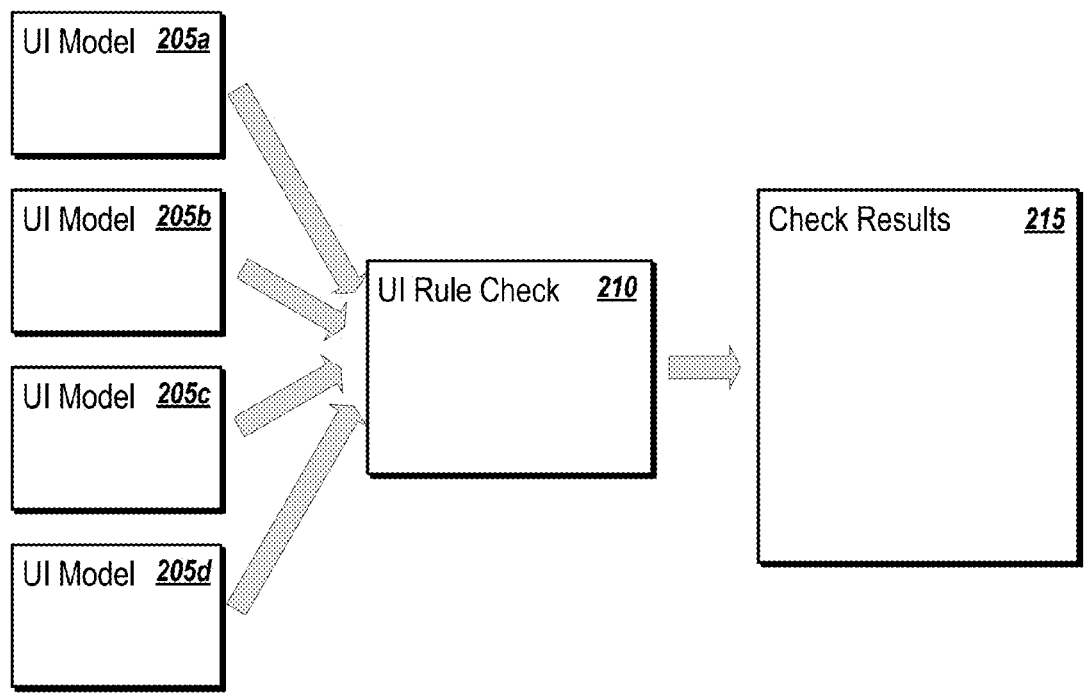
FIG. 3A is a representation of an example use of a digital UI model to generate a runtime UI.

As shown in FIG. 3A, each UI rule check script 210 can be executed to parse each identified UI model (e.g., 205*a-d*) to identify characteristics of each UIs' attributes and determine whether the UI's attributes satisfy the UI style guide rule represented by the UI rule check script 210. For instance, FIG. 3B illustrates a snippet 305 of an XML-based, parsable, digital UI model of a particular UI to be parsed by a UI rule check script 210, including the snippet 310 of an example UI rule check script shown in FIG. 3C. As shown in FIG. 3B, a highlighted portion 315 (highlighted for purposes of convenience in illustrating the present example and not necessarily as a feature in an actual UI model) relates to a text used in a title field of a particular UI element within a UI modeled by the UI model. In this example, the UI model specifies, among several other attributes, that a title field attribute of the UI is to include the words "Details: Line Items of (0)," where "(0)" designates a placeholder for additional text. Turning to FIG. 3C, the UI rule check script corresponding to at least one UI style guide rule relating to title fields of a UI, includes a check (shown in highlighted portion 320) corresponding to a UI style guide rule that such title fields begin with the words "Details:". In this example, if the UI rule check script check (of 320) identifies that the title field does not begin with the word "Details:", a message is returned indicating that the rule has been violated and that the violation has a "High" priority. Accordingly, in the example of the UI model at least partially illustrated in FIG. 3B, the highlighted title field attribute 315 in snippet 305 does begin with the word "Details:" and, as a result, when the portion 320 of the UI rule check script snippet 310 is executed to parse highlighted portion 315, the UI rule check script does not generate the message indicating that the highlighted title field attribute 315 violates the UI style guide rule requiring that the title field begin with "Details:". In other examples, UI rule check scripts 210 can be configured to return check result data 215 positively identifying whether the UI, modeled by the UI model 205, satisfies or violates the underlying UI style guide rule. Check result data 215 can be stored to record historical compliance with UI style guide rules, as well as for use by UI rule engine 200, as will be explained in further detail below.

Returning to FIG. 2, a UI rule engine 200 can further be operable to generate reports, for example, using a reporting module 230, from check result data 215 generated from rules consistency checks performed by the rule check module 225. Reports can include statistical and quantitative measures of style guide rule compliance across a plurality of rules and UIs. For example, a user can request a report showing the number or percentage of style guide rules violated (or, alternatively, satisfied) by a particular UI or group of UIs. Through such a report, a user can identify which UIs or UIs groups that are most consistent with a set of UI style guide rules. Reports can also be generated on a rule-by-rule basis. For instance, a plurality of UIs within a software environment or application can be analyzed to see which UIs are in compliance with a single style guide rule. In some instances, a report can include style guide rule consistency measures on an application-by-application basis. For instance, a measure of the style guide consistency of a group of UIs associated with a particular application can be generated and compared against other applications' UI sets. In still other examples, reporting module 230 can calculate and generate reports ranking, filtering, or identifying particular UIs or UI rules based on style guide consistency checks. For instance, a listing of the most-violated UI rules can be generated or a listing of those UIs with the lowest or highest degree of style guide compliance, as examples.

Reporting module 230 can be used in connection with a certification process for applications developed for use within a particular software environment. For instance, a particular software environment can require that applications offered, sold, executed, or otherwise used in connection comply with a minimum standard of style guide consistency for UIs within the software environment in order to be certified for use in connection with the environment. For example, UIs within a particular software environment may be required to be in 80% compliance with style guide rules set forth in connection with the particular software environment, such as a modular, enterprise software system. Applications submitted, for example, by third-party vendors and developers, can be tested for compliance using the rule check module 225, the reporting module 230 determining, from the rule check module result data 215, the aggregate compliance of the submitted application's UIs with the software environment's UI style guide rules. In some examples, applications for use within the software environment can be offered for download, purchase, subscription, or use through an electronic storefront, or application store, affiliate with the software environment. Applications may be required to be certified prior to being offered for access through the storefront, a portion of the certification being tied to UI style guide compliance.

While reports can be generated from previously-collected result data 215, reports can also be based on a real time snapshot of UI compliance with one or more UI style guide rules by one or more UIs. This can be useful within dynamic software environments where UI attributes and style guide rules are frequently evolving, being modified and fine-tuned. Accordingly, to obtain the most accurate reporting data, a style guide check can be performed using rule check module 225, the results of the check being immediately passed to reporting module 230 for analysis and use in generating a report based on the check.

As noted above, in some instances, administrators or developers of UIs within a particular software system may desire to modify UI models 205 or UI rule check scripts 210 to reflect corresponding modifications to UIs and UI style guide rules respectively. A rule manager 240 can be adapted to perform modifications on UI rule check scripts 210, for instance, to reflect the addition of a new style guide rule or the modification or deletion of an existing style guide rule. Further, modifications can be made to UI models via a UI model manager 245, for example, to resolve UI style guide violations in the underlying UIs. In some cases, UI model manager 245 can modify UI models 205 as a batch, for example, to correct a particular style guide violation common to UIs within the batch. This can be particularly advantageous in systems where dozens to thousands of UIs exist that potentially require the same, consistent modification.

Mass changes of UIs (and their corresponding UI models) can be required, for example, by virtue of a change to the UI style guide and, accordingly, UI style guide scripts, given that many UIs within a system may have been developed prior to the introduction of the new or modified UI style guide rule. As a result, modifying a particular style guide rule or performing a mass (or batch) UI model modification can impose costs despite the cost savings realized by batch UI modifications. Consequently, it can be useful to survey a set of UIs, in advance of a rule change or batch modification to forecast the impact of a particular change. Accordingly, a planning module 235 can be included within a UI rule engine 200 to perform hypothetical reporting and forecasting of changes to UI style guide rules or UI models. For instance, a new style guide rule may be proposed for a software environment including a set of existing UIs. A temporary UI rule check script can be generated, corresponding to and modeling the new rule. The temporary UI rule check script can be "temporary" in the sense that the new rule modeled by the temporary UI rule is only a proposed, hypothetical rule. Accordingly, the temporary UI rule check script modeling the new UI style guide rule should not be added to the set of standard UI style guide check scripts 210 until the new rule is approved and implemented as one of the standard UI style guide rules. The temporary UI rule check script can, however, be used to parse the set of existing UI models 205 in a manner similar to other UI rule check scripts 210 to determine whether and which of the UI models would satisfy the new, proposed style guide rule. Through the generation and execution of a temporary UI rule check script, a developer can determine, in advance of a change to a style guide rule, how many UIs will be affected by the change.

In some implementations, UI rule engine can operate in connection with a UI development tool, such as UI development tool 118, shown in the example of FIG. 1. Indeed, in some examples, all or a portion of the functionality provided though UI rule engine 200 can be integrated into a UI development tool, for instance, using a UI developer interface 250. A UI developer interface 250 can coordinate communications and operations performed in connection with a UI development tool. A UI development tool (such as UI development tool 118) can be a software application adapted to build, develop, edit, and modify UIs for use with one or more software applications or environments. A UI development tool can be a design time tool offered, for example, in connection with an integrated development environment (IDE). Further, in some examples, UIs generated or operated upon using an example UI development tool can include corresponding UI models. Indeed, a UI development tool can generate parsable, design time UI models for use in generating the corresponding runtime UI.

In typical systems, UI development tools are not tied to UI style guide rules, and UI developers are left unassisted in maintaining an understanding of style guide requirements for a particular UI developed for a particular software system having its own unique style guide rules. Integrating or coupling a UI development tool with UI rule engine 200 can allow a UI developer to receive immediate feedback for a design decision implemented or contemplated using a UI development tool. For instance, a UI developer may designate, using a UI development tool, that a text form field, button, or other control be positioned in a particular location of a UI developed using the UI development tool. The UI development tool may include a graphical representation of the UI being built. While the decision of the UI designer to place a particular UI control in a particular location within the UI may be appealing to the UI designer, the decision may violate a particular UI style guide rule. A user modification of a UI in development using a UI development tool can trigger a UI rule consistency check using, for example, rule check module 225 and one or more rule check scripts 210. For instance, as a user builds a UI using a UI development tool, a corresponding, parsable UI model can be developed. While the UI model may be incomplete, UI attributes that have been defined in the UI model can nonetheless be parsed, using one or more rule check scripts 210 to determine whether the defined attributes satisfy one or more UI style guide rules action. The results of the UI rules consistency check can then be presented to the user of the UI development tool, via UI developer interface 250, providing immediate feedback to the user regarding the style guide consistency of a UI design choice implemented using the UI development tool.

In some examples, the nature of the user's actions defining UI attributes using the UI development tool can be used to dynamically select UI rule check scripts 210 determined to be relevant to the user's action. For instance, in the example of a user defining the number of columns within a table in a UI developed using the UI development tool, the UI developer interface 250 can identify that the user action relates to table UI elements and dynamically select one or more UI rule check scripts 210 identified as pertaining to style guide rules defining guidelines for table UI elements. In this manner, the number of UI consistency checks can be focused to the relevant actions of the UI development tool user, thereby improving the performance and efficiency of the UI rule engine's interaction with and service of the UI development tool.

UI developer interface 250 can also be used to assist a UI developer in understanding UI style guide rules relating to a particular UI design project. For instance, a rule library 255 can be provided with descriptions detailing particular UI style guide rules. The rule library 255 can, in some examples, be a wiki-based guide outlining descriptions of and known solutions to violations of UI style guide rules, with one or more users of the UI rule engine 200 providing content to the rule library 255. A user can select a link, for example, to a particular UI style guide rule, and access a detailed explanation of the rule, to assist the user in avoiding UI style guide rule violations during development. In some examples, the identification of a UI style guide rule can be presented in connection with UI rule consistency check feedback provided through the UI developer interface 250 to the UI development tool, as explained above, for example in connection with a UI design choice implemented using the UI development tool. The feedback can include the identification of a UI style guide rule violation, identifying the violated rule. A user can select the identified rule to access the rule library 255 content explaining the identified style guide rule. In this manner, a user can be assisted in understanding style guide requirements, as well as understanding how style guide violations can be remedied (using the UI development tool) and avoided. Such knowledge base functionality can be particularly useful in connection with systems employing multiple UI designers, including third-party UI designers who may develop UIs according to multiple different style guides, improving style guide rule compliance through education of a particular UI style guide. Further, UI rule engine 200 can maintain UI rule check scripts 215 for multiple different style guides and perform UI style guide compliance checks, reporting, planning, and UI development integration for each of the multiple different style guides. Indeed, some UI rule check scripts 215 can be reused across multiple different style guides sharing one or more style guide rules. Further, a UI developer interface 250 can identify the relevant style guide applying to a particular UI development project, and dynamically select those UI rule check scripts 215 pertaining to the identified UI style guide.

Figure 4:
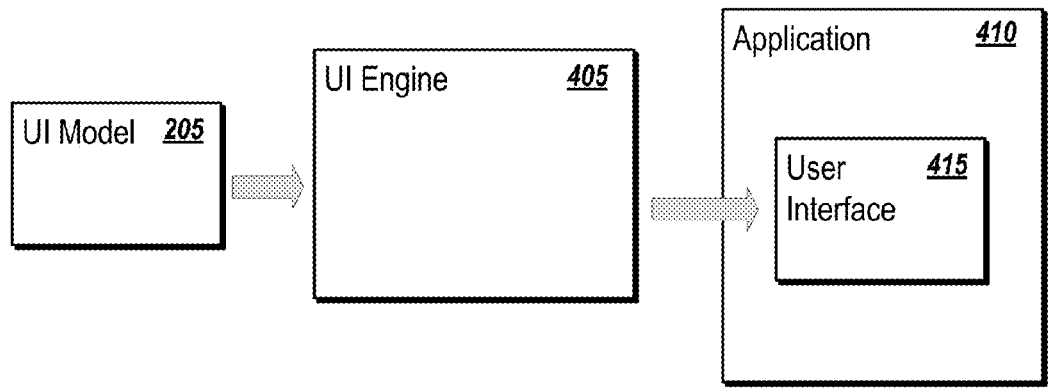
FIG. 4 is a representation of an example use of a UI rule check script to parse a batch of digital UI models to generate UI consistency check data.

Turning to FIG. 4, a design-time UI model 205, generated, for example, using a UI development tool, can define attributes of a UI 415 of a particular software application 410. The UI model 205 can be an XML file, or some other parsable file, that can define and identify, to a UI generation engine 405, the attributes to be included in a particular UI. The UI model snippet 305 of FIG. 3B is but one example of a parsable UI model file. A UI generation engine 405 can build the UI 415 corresponding to and defined by the UI model 205 by parsing the UI model to identify the set of attributes defined for the UI and build the UI by constructing the UI from UI elements and definitions specified in the attributes defined in the UI model. In such examples, modifications made to the UI model 205 can propagate to the runtime instances of the corresponding UI 415, further illustrating the advantage to using UI models to implement batch modifications, or edits, based, for example, on remedying UI style guide rule violations.

Figure 5A:
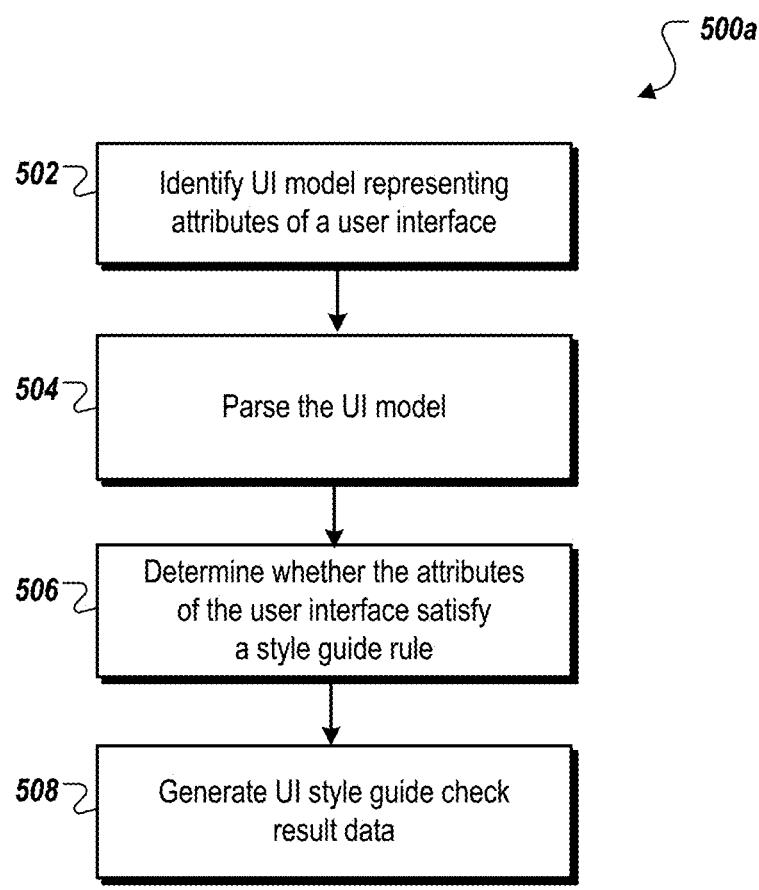
FIG. 5A is a flowchart of an example technique for checking attributes of a UI for compliance with one or more UI style guide rules.

Turning now to FIG. 5A, a flowchart 500a is shown of an example technique for checking attributes of a UI for compliance with one or more UI style guide rules. At least one particular digital UI model in a plurality of digital UI models can be identified 502, each of the UI models defining attributes of at least one UI in a plurality of UIs. The particular digital UI model can correspond to and represent attributes of a particular UI in the plurality of UIs. The particular UI model can be parsed 504 to identify the attributes of the particular UI to determine 506 whether the attributes of the particular UI satisfy a particular UI style guide rule in a plurality of UI style guide rules. In some instances, a particular UI check script, modeling the particular UI style guide rule, can be used to parse 504 the UI model and determine 506 whether the attributes of the particular UI satisfy the particular UI style guide rule. Style guide check result data can be generated 508 identifying whether the at least one particular UI model satisfies the particular UI style guide rule.

A UI style guide consistency check can check one or more UI models against one or more UI style guide rules (using one or more corresponding UI rule check scripts). For example, defined sets of UIs can be checked as a group, such as a set of UIs of a particular type, UI developed by a particular developer, or UIs of a particular application, among other examples. In some instances, a plurality of UIs can be checked against one or more UI style guide rules. Further, a single system can include thousands of UIs. In typical UI development, hundreds of man hours can be spent manually checking UIs for compliance with style guide requirements. In some instances, given the cost of checking each UI for style guide compliance, a UI administrator may only be able to spot check UIs, leaving the possibility that several style guide violations may not be identified and remedied prior to the UIs being released for commercial runtime consumption. Using the concepts described above, large batches of parsable UI models can be parsed, identifying attributes of the represented UI. The attributes can then be examined to determine which attributes of which UIs in the batch comply or do not comply with which UI style guide rules. Indeed, an entire set of UIs can be checked for compliance with UI style guide rules in a single batch check, reducing the time necessary to ensure UI style guide compliance to a fraction of the time typically spent manually checking during typical UI development efforts.

One or more UIs, or a batch of UIs, can be checked against one or more UI style guide rules during a single style guide compliance check. A set of UI style guide rules can be identified to serve as the basis of a UI style guide consistency check. For instance, a particular category of style guide rules, or set of style guide rules associated with a particular developer or company can be bundled together with corresponding UI rule check scripts for use in a particular style guide compliance check. Indeed, one or more UIs can be checked against an entire set of UI style guide rules. Each corresponding UI model can be parsed by a corresponding UI rule check script corresponding to the set of UI style guide rules. Indeed, in some examples, parsing of multiple UI models by multiple UI rule check scripts can be performed in parallel to expedite performance of the entire consistency check. For example, checking can begin with a first UI rule check script parsing a first UI model in parallel with a second UI rule check script parsing a second UI model. Later, the first UI rule check script can parse the second UI model in parallel with the second UI rule check script parsing the first UI model, and so on. In some implementations, style guide consistency checks can be further expedited by first matching UI style guide rules with UIs to which the UI style guide rules are relevant, prior to executing the UI rule check scripts to parse the corresponding UI models. For instance, a first UI may include a table UI component, while a second UI may not. Accordingly, in the set of UI style guide rules against which the consistency check is to be performed, one or more UI style guide rules may apply to table UI components. By first identifying that the second UI does not include a table UI component, parsing of the UI model corresponding to the second UI by the table-related UI rule check scripts can be avoided, with the table-related UI rule check scripts only parsing those UI models that include table UI components. Indeed, in any UI rule consistency check, parsing of UI models can be preceded by filtering the set of UI models for attributes related to the UI style guide rule to be checked.

In response to receiving data identifying results of a particular style guide consistency check, one or more UI attributes can be identified that violate one or more of the checked UI style guide rules. In some instances, the perceived seriousness of a particular style guide violation can also be identified and presented to the user to assist the user in assessing how to address the violation. Indeed, a user can trigger resolution of the one or more style guide violations in response to being notified of the violations. A resolution can be as simple as, for example, receiving a user request to ignore an identified style guide violation. Allowing a user to ignore a style guide violation provides for the sometimes needed flexibility for a particular UI to be developed with attributes that are an exception to a particular one-size-fits-all style guide rule, for example. A user, upon reviewing a particular style guide violation can, for instance, determine that the violation is not serious, accurate, or appropriate for a particular UI. Receiving a user request to ignore a particular style guide violation can cause future checks to ignore the violation as well.

In other instances, identification of a UI style guide rule violation can motivate the user to access the offending UI model and edit the UI model to redefine the offending UI attribute to bring the corresponding UI in compliance with the violated style guide rule. Redefining of the UI model to bring the UI model in compliance with a particular UI style guide rule can also be automated and performed by instructions executed by one or more computing devices. Further, where multiple UI models have been identified as violating UI style guide rules, one or more known solutions to the violation can be identified and performed on each of the offending UI models as a batch to consistently remedy the one or more violations across the batch of UIs. A solution can be identified or generated, dynamically, by one or more computing devices, or, alternatively, by the user, specifying how the offending UI models should be modified in response to the detect UI style guide violations. In one example, a common style guide error relating to the naming convention of certain button UI control elements can be identified in several UIs. For instance, a particular style guide rule can specify that button UI controls used to start a process be labeled "Start." Through a UI style guide consistency check of the particular style guide rule, it can be identified that several UIs labeled the button UI control "Go," rather than "Start," in violation of the style guide rule. Amending the definition of the button's labeling can be accomplished by identifying and amending a line of code with each offending UI's respective UI model. Accordingly, an instruction can be executed to automatically identify each of the UI models of the offending UIs, identify the offending attribute in each UI model, and amend the offending attribute in each UI model to re-label each button "Start," rather than "Go." By so doing, common UI style guide violations can be both detected and remedied by performing batch check and modification operations on, sometimes, large sets of UIs via parsable UI models of the UIs.

Figure 5B:
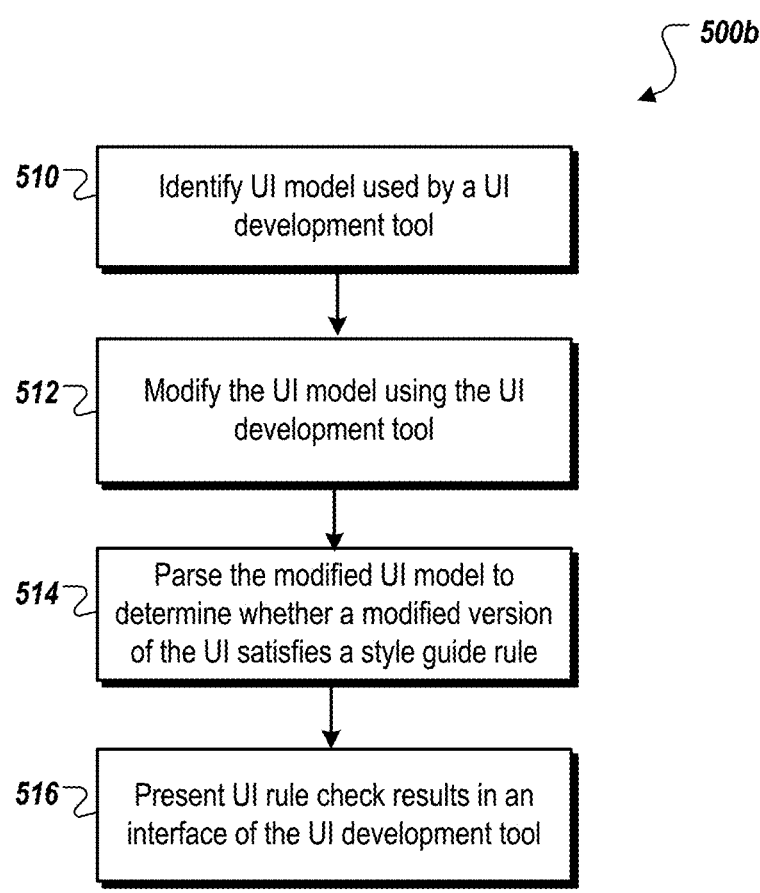
FIG. 5B is a flowchart of an example technique for checking attributes of a UI for compliance with one or more UI style guide rules in connection with an example UI development tool.

Turning to FIG. 5B, a flowchart 500b shows an example technique for checking attributes of a UI for compliance with one or more UI style guide rules in connection with an example UI development tool. At least one particular digital UI model in a plurality of digital UI models can be identified 510, the particular UI model currently accessed by an UI development tool, such as a UI development tool integrated with a UI rule engine (such as described above) or one or more UI rule check scripts. In some instances, the particular UI model before the UI development tool can be modified 512 using the UI development tool. The modification to the particular UI model can correspond to a desired modification of a particular UI modeled by the particular UI model. A modified version of the particular UI can be parsed 514 to determine whether the modified particular UI violates at least one particular user interface style guide rule in a plurality of user interface style guide rules. The results of the parsing (i.e., the UI style guide rule consistency check) can then be presented 516 in a user interface of the UI development tool as feedback to the UI development tool user regarding the modification to the particular UI model.

The UI development tool can be directly integrated with the functionality of software implementing UI style guide consistency checks. For instance, UI rule check scripts can be integrated into the UI development tool, allowing the UI development tool to trigger execution of one or more UI rule check scripts to parse the UI model of a UI currently edited or under development using a UI development tool. Execution of one or more UI rule check scripts through a UI development tool can be triggered, for example, in response to a user request to perform a style guide consistency check or automatically, in response to a UI development tool event. For instance, user can perform operations using the UI development tool to modify and define attributes of a UI. Such operations can trigger style guide consistency checks to check the modified UI against the style guide rule. Further, detected style guide violations can be conveniently resolved using the UI development tool, where the user can directly redefine aspects of the UIs underlying UI model. In some instance, UI development tools can highlight or provide direction to the user to implement a resolution to a detected UI style guide rule violation. For instance, the UI development tool can highlight a UI component relating to an offending UI attribute or launch a help tool to suggest known remedies for the particular style guide violation.

Figure 5C:
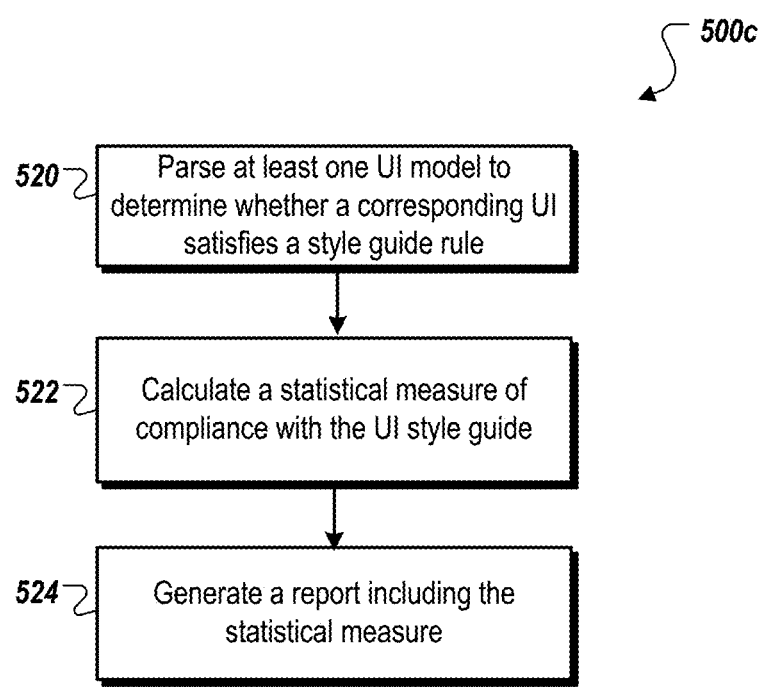
FIG. 5C is a flowchart of an example technique for generating UI rule consistency statistics based on checks of UI models representing UIs in a software environment.

FIG. 5C illustrates a flowchart 500c of an example technique for generating UI rule consistency statistics based on checks of UI models representing UIs in a software environment. Generating rule consistency statistics can be performed, for example, using a reporting module of an example UI rule engine. At least one UI model can be parsed 522 to determine whether a corresponding user interface, in a plurality of user interfaces within a software environment, satisfies at least a first UI style guide rule in a plurality of UI style guide rules associated with the software environment, the particular digital UI model defining a plurality of attributes of the particular user interface. At least one statistical measure can be calculated 522 relating to particular UI's compliance with UI style guide rules. The statistical measure can be calculated 522 based at least in part on the determination 520 of whether the particular UI satisfies the first UI style guide rule. A report can be generated 524 including the calculated statistical measure. The generated report can be adapted for presentation to a user, for instance, using a GUI.

Reports can be generated that include a wide variety of statistical measures based on the results of one or more style guide consistency checks, including consistency checks launched in connection with a reporting request. Reports can provide style guide violation statistics at the UI level, identifying style guide violations or style guide rule compliance rates for each UI, UI type, UI grouping, or UI component checked for style guide compliance. For instance, an aggregate compliance rate can be calculated for a particular UI based on the UI's compliance with a set of UI style guide rules. Style guide compliance trends can also be calculated and reported. For instance, common style guide violations can be identified for logical groupings of UI. For instance, a set of UIs developed by a particular vendor or associated with a particular software application can be analyzed to see if recurring violations of one or more style guide rules exist across the set of UIs. Further, rule-based statistics can be calculated, for instance, to identify the rate of compliance with each UI style guide rule in a set of UI style guide rules. UI style guide rules and UIs can be ranked or graded based on compliance statistics. For instance, a most-violated set of UI rules can be identified. This can be useful, for instance, in identifying style guide rules that are poorly defined, impractical, or outdated. Alternatively, reports showing style guide rules with poor compliance can serve as the basis of training initiatives designed to better educate participating UI designers with regard to the oft-violated rule. Further, a low compliance rate can also suggest potential errors in UI rule check scripts used to detect violations of the underlying UI style guide rule.

UI models and UI rule check scripts can be also used to produce data for reports not directly related to style guide rule violations. For instance, parsing of a UI model by a UI rule check script can result in the detection of the presence (or absence) of particular UI attribute generally with the UI model. Accordingly, reports can be generated, based on these findings, that compile statistics regarding the general frequency of a UI attribute or UI component's inclusion in UIs within a software environment. For instance, a UI rule check script relating to drop-down UI menus can identify those UI models including such elements. As a result, the number or percentage of UIs in the system that include drop-down menus can be quickly discovered for potentially large sets of UIs within a system.

Figure 5D:
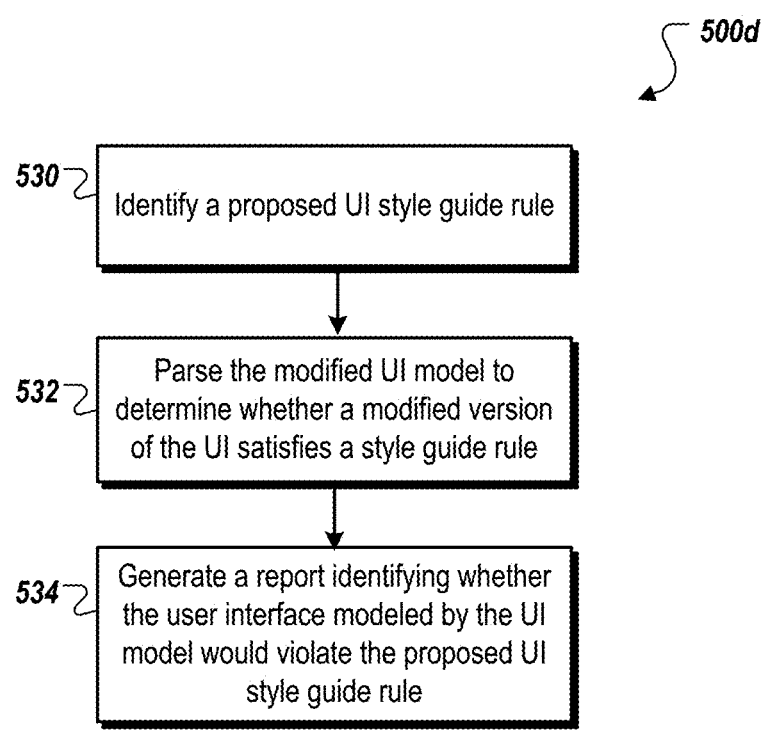
FIG. 5D is a flowchart of an example technique for forecasting effects of a change involving one or more UI style guide rules.

FIG. 5D illustrates a flowchart 500d of an example technique for forecasting effects of a change involving one or more UI style guide rules. At least one proposed user interface style guide rule can be identified 530, for example in a request to forecast the effect of implementing the proposed user interface style guide rule. The proposed user interface style guide rule can apply to at least one user interface in a plurality of user interfaces for use in connection with at least one software application. Each user interface in the plurality of user interfaces can have an associated digital UI model representing attributes of the respective user interface. At least one of these UI models can be parsed 532, for example by a UI rule check script generated for the proposed user interface style guide rule, to determine whether attributes of the particular user interface would violate the proposed user interface style guide rule. Data identifying the results of the consistency check can be sent 534 identifying whether the at least one particular user interface in the plurality of user interfaces would violate the at least one proposed user interface style guide rule.

As in other examples, hypothetical style guide rule consistency checks can be carried out on a batch-basis across multiple UI models. Further, consistency checks can be limited, as in other examples, to UI models dynamically identified as potentially affected by the proposed UI style guide rule. Proposed UI style guide rules can represent potential new style guide rules, or potential modifications or deletions of existing style guide rules. A hypothetical style guide rule consistency check based on one or more proposed UI style guide rules can be used in a planning phase, prior to the formal adoption of the proposed rules. Accordingly, in addition to identifying the potential effect the adoption of a particular proposed UI style guide rule would have on a set of UIs, a cost of implementing the proposed UI style guide rule can also be calculated. For instance, potential violations of the proposed UI style guide rule can be detected through a hypothetical style guide rule consistency check. The severity of the violation can also be identified. A cost, or grade, assigning a quantitative measure to the potential effect of adopting a proposed UI style guide rule, can be calculated based both on the number and the severity of the detected, potential violations of the rule detected during the check. Such quantitative measures can be used by administrators in their decision to adopt and deploy a particular proposed UI style guide rule.

Adoption of a proposed UI style guide rule can result in the addition of a corresponding rule check script to a plurality of UI rule check scripts. Further, subsequent UI style guide consistency checks can check UIs' continued compliance with the newly-adopted UI style guide rule following adoption of the rule. Indeed, modification operations can be performed across one or more UI models found to violate a newly-adopted UI style guide rule in order to bring offending UIs in compliance with the new rule.

Figures 1, 6B:
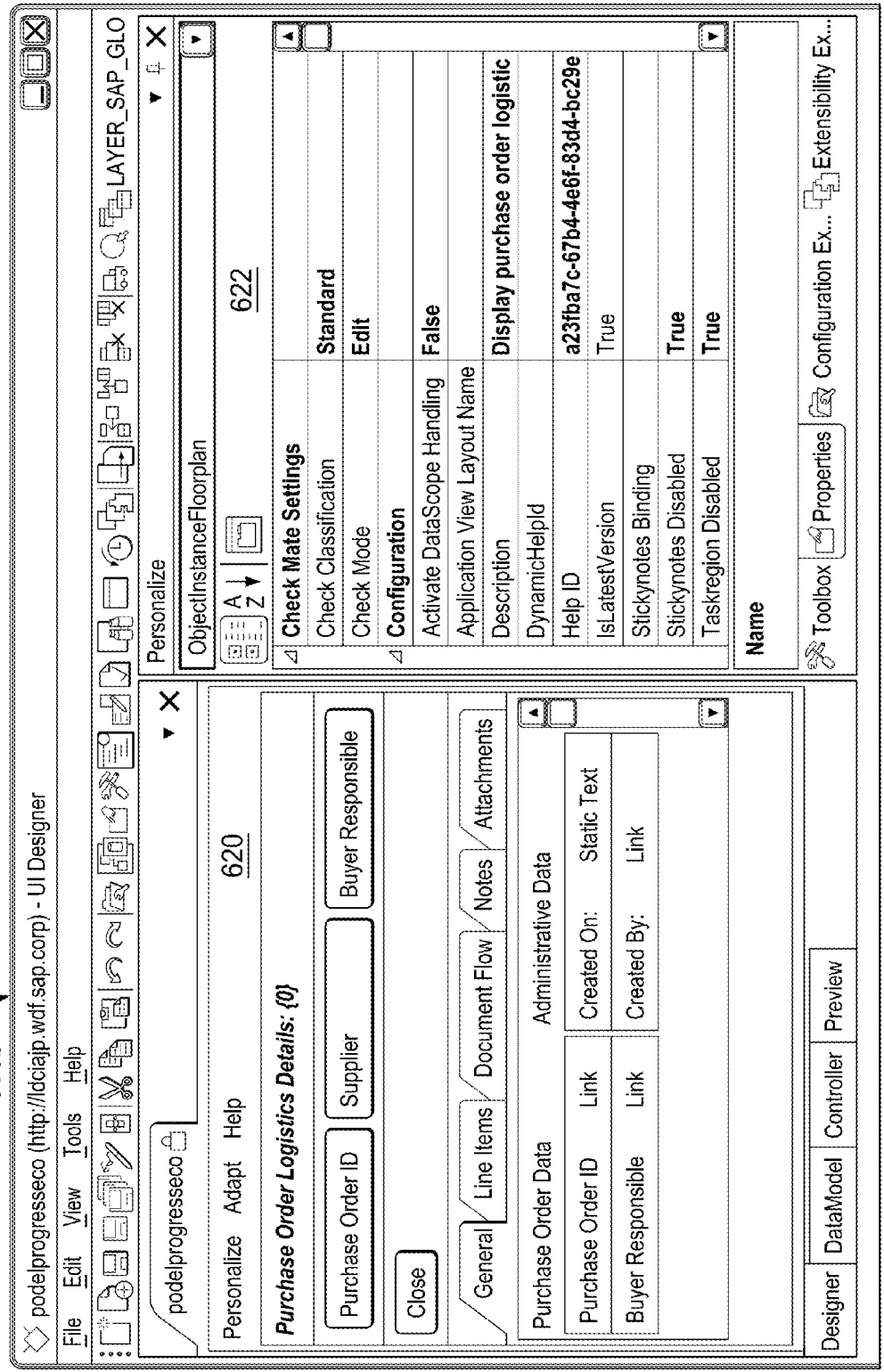

FIGS. 6A-6C illustrate example screenshots of UIs used in connection with an example UI rules engine. FIG. 6A, for example, illustrates a presentation of UI style guide consistency check results. Varying levels of detail can be presented for results of a style guide consistency check. In the example of FIG. 6A, at least a portion of a listing of style guide consistency check results is presented to a user. The listing, in this particular example, includes an identification of the offending UI attribute 602 as well as an identification 604 of the detected inconsistencies with the style guide rules. In this example, both style guide "violations" and "warnings" have been detected. A "violation" can indicate that a violation of a style guide rule has been detected for the corresponding UI attribute. A "warning," can, for instance, instead indicate that UIs in a set of UIs attempt to comply with a particular style guide rule in an inconsistent manner, or in a manner technically in keeping with the style guide rule but otherwise bordering on a violation of the rule. Additionally, the listing can include identifications 606 of a calculated or assigned priority level determined for the detected inconsistency or violation, as well as a message 608 describing the nature of the violation and/or violated UI style guide rule. The priority level 606 can be pre-assigned to violations of a particular type or dynamically determined based on factors including how the offending UI attribute violated the corresponding UI style guide rule, how many times the rule was violated, a deployment schedule for the corresponding UI, or how many other violations were detected for a particular UI or UI attribute, among other examples.

As shown in the screenshot 600a of FIG. 6A, data can be maintained relating to the nature and characteristics of a particular UI attribute 602. For instance, the type of UI 610 to which the UI attribute applies can be maintained, as well as presented in a listing of style guide consistency check results to assist the user in detecting style guide consistency trends across the set of results. Similarly, a software application using the offending UI can also be identified 612. In other examples, style guide consistency check results can further include other columns, fields, and information not shown in the example of FIG. 6A, including an identification of the UI model, an identification of the particular violated UI style guide rule, a directory address of the offending UI or UI attribute, tools for launching remedies for the detected style guide rule violations, identification of developers responsible for developing or last-modifying the particular UI attribute, the date of the UI's last modification, among other features. Still other examples can provide less-detailed representations of results of style guide consistency checks, such as the links to an offending UI model, links to descriptions of individual style guide violations, or by graphically highlighting offending UI elements or lines of code in UI models representing an offending UI attribute, as but some examples.

Turning to FIG. 6B, a screenshot 600b is shown of an example interface of a UI development tool integrated with style guide rule checking functionality. One or more windows 620, 622 can be provided for use in modifying attributes of a UI using the UI development tool. For instance, a window 620 can be provided presenting a representation of the UI under development using the UI development tool. The window 620 can present a representation of the UI as it would be presented to a user. A user-developer can specify attributes of the UI by adjusting UI elements within the representation presented in window 620. Alternatively, a user can also specify UI attribute values in window 622. Modifications to the UI made in either window 620 or 622 can be reflected in the other window. For instance, a modification made to the UI representation in window 620 can change a corresponding attribute of the UI, the change being reflected automatically in window 622. Additionally, changes made to attributes of a particular UI using UI development tool windows 620 or 622 can result in a corresponding modifications being made to at least one particular UI model corresponding to the particular UI. The UI model can be parsed to check the modified UI for compliance with one or more UI style guide rules.

As shown in FIG. 6B-1 and 6B-2, an additional window 624 can be presented to a user in connection with a UI development tool interface, the window 624 presenting results of at least one style guide consistency check on the UI developed using the UI development tool. A user can filter results of the style guide consistency analysis using controls 625, for example, to filter results by violation, warning, among other examples. The results listing presented in window 624 can include an indication of whether a style guide consistency warning (e.g., 626a) or violation (e.g., 626b) was detected, together with an identification 628 of the detected style guide inconsistency and description 630 or other message relating to the detected inconsistency. An identification of the offending UI attribute as well as the path 632 to the attribute in the corresponding UI model can be presented in the window 624. Additionally, controls 634 can be provided allowing users to designate that a detected violation in the listing should either be ignored or confirmed as an incident for later resolution. Indeed, in some examples, a user can immediately remedy an identified style guide inconsistency using the UI development tool by modifying the offending UI attributes to bring them in compliance with the violated UI style guide rule.

FIG. 6C illustrates a screenshot 600c of a presentation of detected hypothetical UI style guide violations of a set of proposed UI style guide rules (detected, for example, using corresponding UI style guide rule check scripts). A listing 640 is shown, generated in response to one or more user requests to forecast the effects of adopting a plurality of proposed UI style guide rules, including new and modified style guide rules. Each row (e.g., 648, 652) in the listing 640 can correspond to a distinct proposed UI style guide rule. Information can be presented, relating to each proposed UI style guide rule, such as a message 642 identifying or describing the proposed UI style guide rule, an application, category, or "area" 644 of the UIs found that would violate the proposed rule, and a count 646 of the number of potential violations detected by checking the UI models for violations of the proposed style guide rules. For instance, a row 648 in listing 640 can relate to a UI style guide rule specifying the correct placement of a "Send" button within a UI for which ten potential violations were identified (i.e. in column 646) within a set of UIs.

Additional details can also be made available to users surveying the results of the forecasted effect of adopting proposed UI style guide rules. For instance, an expansion control (e.g., 650) can be used to expand a row and display additional information relating to a particular analysis of a proposed UI style guide rule. For instance, the expansion control 650 of row 652 has been selected in the screenshot 600c displaying additional details to a user relating to the proposed rule of row 652. For instance, a listing of a plurality of UI categories (e.g., 654) can be presented that would be affected by a proposed UI style guide rule relating to making inclusion of a "Save/Close" button mandatory.

The expanded details can further include presentation of the number of potential violations detected in each UI category. For example, a sub-row 654 corresponding to a "FIN" UI category can indicate that eighteen separate violations of the "Save/Close" button rule were identified in UIs of category "FIN." A UI category can, in some instances, correspond to a particular software application. Depending on the needs of the user, a user can further expand the presentation of forecast information by selecting expansion control 656, for instance, to expand forecast statistics relating to a UI category, such as to display identifications of individual UIs or UI attributes that would violate the proposed UI style guide rule of row 652 within category "FIN." Similar details can be identified for each of the UI style guide rows and UI categories. The screenshot 600c of FIG. 6C, as well as the screenshots 600a, 600b of FIGS. 6A-6B-1 and 6B-2, are presented as illustrative examples only, and numerous additional and alternative interface configurations and functionality can be implemented to assist users in realizing the features described above.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

What is claimed is:

1. A computer-implemented method comprising:
identifying, in memory, at least one particular digital UI model in a plurality of digital UI models, each UI model representing visual attributes of a corresponding software application user interface in a plurality of user interfaces available for access by a UI development tool adapted to modify visual attributes of user interfaces in the plurality of user interfaces, wherein the particular digital UI model represents visual attributes of a particular user interface accessed by the UI development tool;
retrieving at least one particular user interface style guide rule in a set of user interface style guide rules defining styles for user interfaces being developed for a software application;
during development of the software application, parsing, using at least one processor, the particular UI model to determine that at least one visual attribute of the particular user interface violates the at least one particular user interface style guide rule in a plurality of user interface style guide rules;
calculating rule-based statistics to identify a rate of compliance with each user interface style guide rule in the set of user interface style guide rules;
sending data configured for use in presenting, in a user interface of the UI development tool, a presentation indicating that the at least one particular visual attribute of the particular user interface violates the particular user interface style guide rule; and
displaying the presentation further indicating the calculated statistics in the user interface of the UI development tool.

2. The method of claim 1, wherein parsing the particular UI model includes identifying, in memory, a particular UI rule check script from a plurality of UI rule check scripts, each UI rule check script corresponding to a user interface style guide rule in the plurality of user interface style guide rules and adapted, when executed, to parse UI models to determine whether user interfaces corresponding to the UI models violate the corresponding user interface style guide rule.

3. The method of claim 1, further comprising:
receiving a user request to modify at least one attribute of the particular user interface;
modifying the at least one attribute of the particular user interface using the UI development tool; and
modifying the particular UI model to reflect modification of the at least one attribute of the particular user interface.

4. The method of claim 3, further comprising triggering parsing of the particular UI model in response to the modifying of the particular UI model.

5. The method of claim 3, further comprising:
dynamically identifying the particular user interface style guide rule as relevant to the modified at least one attribute.

6. The method of claim 5, further comprising:
dynamically identifying a particular UI rule check script from a plurality of UI rule check scripts, the particular UI rule check script corresponding to the particular user interface style guide rule;
wherein executing the particular UI rule check script parses the particular UI model to determine that the at least one attribute of the particular user interface violates the particular user interface style guide rule.

7. The method of claim 1 wherein the presentation includes identification of the violated particular user interface style guide rule.

8. The method of claim 7 wherein the presentation further includes identification of the at least one attribute violating the particular user interface style guide rule.

9. The method of claim 1, further comprising:
receiving a user request for information relating to a violation of the particular user interface style guide rule by the at least one attribute violating the particular user interface style guide rule; and
sending rule information describing the violated particular user interface style guide rule.

10. The method of claim 9, further comprising retrieving the rule information from a library of rule information describing user interface style guide rules in the plurality of user interface style guide rules.

11. The method of claim 1, further comprising:
receiving a resolution request from a user to resolve the violation of the particular user interface style guide rule.

12. The method of claim 11, further comprising launching resolution of the violation of the particular user interface style guide rule.

13. The method of claim 11, wherein the resolution request includes a user request to ignore the violation of the particular user interface style guide rule.

14. The method of claim 1, wherein the at least one particular user interface style guide rule includes at least a first and a second user interface style guide rules in the plurality of user interface style guide rules and the particular UI model is further parsed to determine whether the particular user interface violates the second user interface style guide rule.

15. An article comprising a non-transitory, machine-readable storage device storing instructions operable to cause at least one processor to perform operations comprising:
- identifying, in memory, at least one particular digital UI model in a plurality of digital UI models, each UI model representing visual attributes of a corresponding software application user interface in a plurality of user interfaces available for access by a UI development tool adapted to modify visual attributes of user interfaces in the plurality of user interfaces, wherein the particular digital UI model represents visual attributes of a particular user interface accessed by the UI development tool;
- retrieving at least one particular user interface style guide rule in a set of user interface style guide rules defining styles for user interfaces being developed for a software application;
- during development of the software application, parsing, using at least one processor, the particular UI model to determine that at least one visual attribute of the particular user interface violates the at least one particular user interface style guide rule in a plurality of user interface style guide rules;
- calculating rule-based statistics to identify a rate of compliance with each user interface style guide rule in the set of user interface style guide rules;
- sending data configured for use in presenting, in a user interface of the UI development tool, a presentation indicating that the at least one particular visual attribute of the particular user interface violates the particular user interface style guide rule; and
- displaying the presentation further indicating the calculated statistics in the user interface of the UI development tool.

16. A hardware system, comprising:
- one or more processors configured to execute a UI development environment adapted to modify visual attributes of user interfaces in a plurality of user interfaces;
- at least one tangible, non-transitory data repository storing a plurality of UI rule check scripts, each UI rule check script in the plurality of UI rule check scripts corresponding to a user interface style guide rule in a plurality of user interface style guide rules and adapted, when executed, to parse at least one digital UI model to determine whether a user interface corresponding to the digital UI model violates the corresponding user interface style guide rule; and
- calculating rule-based statistics to identify a rate of compliance with each user interface style guide rule in the plurality of user interface style guide rules; and
- displaying, in a user interface of a UI development tool in the UI development environment, a presentation further indicating the calculated statistics and that at least one visual attribute of the user interface violates the corresponding user interface style guide rule.

17. The hardware system of claim 16, wherein modification of a particular user interface by the UI development environment modifies a particular digital UI model modeling visual attributes of the particular user interface.

18. The hardware system of claim 16, wherein at least a portion of the plurality of UI rule check scripts are integrated with the UI development environment.

19. The hardware system of claim 16, further comprising at least one data repository storing a plurality of digital UI models, each digital UI model modeling at least a portion of a user interface in a plurality of user interfaces.

20. The hardware system of claim 19, wherein each digital UI model in the plurality of digital UI models is a design time model of a corresponding user interface and is parsable by at least one processor to generate the corresponding user interface for use in runtime.

* * * * *